United States Patent [19]

Hasegawa et al.

[11] Patent Number: 5,140,206
[45] Date of Patent: Aug. 18, 1992

[54] ACTUATOR FOR AUTOMOTIVE VEHICLES

[75] Inventors: Jiro Hasegawa; Yuji Kawamura, both of Yokohama, Japan

[73] Assignee: Jidosha Denki Kogyo K.K., Kanagawa, Japan

[21] Appl. No.: 736,549

[22] Filed: Jul. 26, 1991

[30] Foreign Application Priority Data

Jul. 27, 1990 [JP] Japan .................. 2-80319[U]

[51] Int. Cl.⁵ .............................................. H02K 7/10
[52] U.S. Cl. ........................................ 310/78; 310/83; 310/99; 310/100; 192/1.37
[58] Field of Search ............. 310/78, 92, 83, 100, 310/99; 192/0.0062, 0.07, 20, 1.37, 84 C, 84 R

[56] References Cited

U.S. PATENT DOCUMENTS

| | | | |
|---|---|---|---|
| 4,125,790 | 11/1978 | Stratienko | 310/78 |
| 4,223,254 | 9/1980 | Adams | 318/2 |
| 4,391,356 | 7/1983 | Takemura et al. | 192/84 C |
| 4,980,549 | 12/1990 | Takanashi et al. | 310/83 |

Primary Examiner—Steven L. Stephan
Assistant Examiner—Matt Nguyen
Attorney, Agent, or Firm—Sughrue, Mion, Zinn, Macpeak & Seas

[57] ABSTRACT

An actuator which comprises a reversible motor, a solenoid, movable clutch disc to be attracted by the solenoid, a driving clutch disc supported rotatably between the movable clutch disc and the solenoid and driven by the motor. The movable clutch disc and the driving clutch disc are provided with teeth to be engaged with each other and having inclined engaging flanks so as to be disengaged from each other due to slippage caused between the inclined engaging flanks of the teeth. According to this invention, it is possible to interrupt a force larger than a predetermined value and transmit reliably a smaller force to prevent damage to the throttle members.

1 Claim, 3 Drawing Sheets

5,140,206

ACTUATOR FOR AUTOMOTIVE VEHICLES

BACKGROUND OF THE INVENTION

1. Field of the Invention

This invention relates to a motor-drived actuator having an electromagnetic clutch, and in particular to an actuator used for driving a throttle in an automatic cruise control system of automotive vehicles, for example.

2. Description of the Prior Art

Heretofore, there has been used an electromagnetic clutch of a friction type in the motor-driven actuator of this kind. The electromagnetic clutch of this type is so structured as to transmit torque of a motor to an output pulley connected to, for example, a throttle wire by frictional force caused between plane shaped clutch discs. Therefore, there is a problem in that it is not possible to maintain the torque transmittable through the clutch discs constant due to abrasion of surfaces of the clutch discs or slippage between both clutch discs.

In case where teeth or racks are provided on the respective surfaces of the clutch discs so as to be meshed with each other, it is possible to transmit the large torque infallibly. However on the other side, there is the possibility that the throttle valve or the throttle wire may be damaged if the maximum output of the motor is applied directly on them for some reason.

SUMMARY OF THE INVENTION

This invention is made to solve the above-mentioned problems of the prior art. It is an object to provide an actuator which interrupts a torque large than a predetermined value and will output only a torque within the predetermined value infallibly.

The construction of the actuator for automotive vehicles according to this invention in order to accomplish the above-mentioned object is characterized by comprising a reversible motor, a solenoid installed in a casing, a movable clutch disc connected with an output pulley and to be attracted by excitation of the solenoid, a driving side clutch disc supported rotatably between the solenoid and the movable clutch disc and rotably driven by the motor through a reduction gear, and the movable clutch disc is disposed with a plurality of teeth having inclined engaging flanks on an attractive face thereof and the driving side clutch disc is disposed with a plurality of teeth to be engaged with the plurality of teeth of the movable clutch disc and having inclined engaging flanks similarly to the teeth of the movable clutch disc.

In the actuator according to this invention, the movable clutch disc and the driving side clutch disc are provided with a plurality of teeth to be engaged with each other on the opposite surface respectively, and the respective teeth of both clutch discs have inclined flanks to be in contact with each other at the time of attracting the movable clutch disc toward the driving side clutch disc by the excitation of the solenoid.

Therefore, torque of the motor is transmitted to the output pulley reliably due to friction caused between the inclined engaging flanks of the teeth formed on both the clutch discs when force applied on the inclined engaging flanks is not so large. However if the force applied on the inclined engaging flanks becomes larger than a specific value which depends on an inclination angle of the engaging flanks, coefficient of friction between the engaging flanks and attractive force of the solenoid for the movable clutch disc, the movable clutch disc is disengaged from the driving side clutch disc since a component of the force applied on the inclined engaging flanks overcomes the attractive force of the solenoid.

In such a manner, according to this invention, the force larger than the predetermined value is never transmitted to the output pulley in spite that the force smaller than the predetermined value is transmitted reliably through the output pulley.

DESCRIPTION OF THE PREFERRED EMBODIMENT

Figure 1:
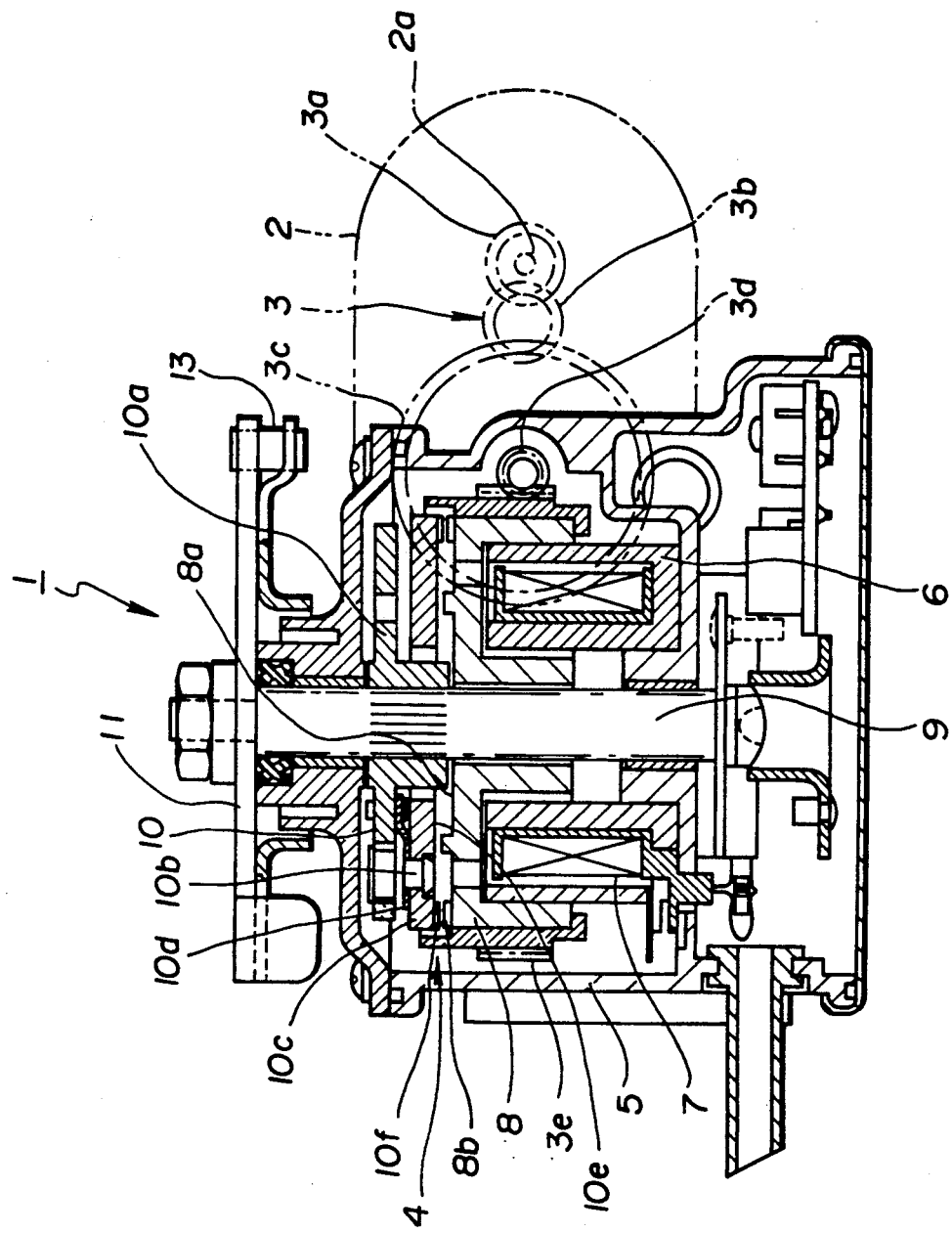
FIG. 1 is a vertical sectional view illustrating an embodiment of the actuator according to this invention.

An actuator for automotive vehicles according to an embodiment of this invention will be explained below on bases of FIG. 1 to FIG. 4.

The actuator 1 shown in the figures is housed with a motor 2 having a shaft 2a rotatable in forward and reverse directions according to the current direction, reduction gears 3 and an electromagnetic clutch 4 composed of a solenoid 7, a first clutch disc 8 and a second movable clutch disc 10c in a casing 5, and the solenoid 7 is contained in a coil casing 6 fixed on a bottom part of the casing 5. The solenoid 7 is connected to a controller (not shown).

The motor 2 is provided with a pinion 3a secured on the motor shaft 2a thereof and the motor is connected to the controller.

The reduction gear 3 comprises the pinion 3a secured to the motor shaft 2a, an intermediate pinion 3b meshed with the pinion 3a, a pinion with worm 3c meshed with the pinion 3b, and a worm wheel 3e meshed with a worm 3d of the pinion with worm 3c, which is the final gear of the reduction gears 3. The worm 3e is secured to the first clutch disc 8 by fitting the worm wheel 3e on the outer periphery of the first clutch disc 8.

The driving side clutch disc 8 is pieced through by an output shaft 9 held rotatably in the center part of the casing 5 and supported rotatably on the coil casing 6. The first clutch disc 8 is provided with a plurality of teeth 8b having inclined engaging flanks 8c round the circumference on the upper face 8a so as to be engaged with teeth 10f of the second clutch disc 10c (will be described later) as shown in FIG. 3.

The actuator 1 is provided with a disc 10 comprising a fixed disc 10a and the movable second clutch disc 10c on the upper side of the driving side clutch disc 8 in FIG. 1. The fixed disc 10a is fixed on the output shaft 9 supported rotatably in the casing 5, and the movable second clutch disc 10c, which is made from ferromagnetic material, is connected with the fixed disc 10a through a pin 10b so as to rotate together with the fixed disc 10a. The pin 10b is engaged with a tip end of the flat spring 10d of which base end is fixed to the fixed disc 10a so that the movable second clutch disc 10c may be movable up and down within some extent and energized upwardly in FIG. 1 by elasticity of the flat spring 10d.

Figure 3:
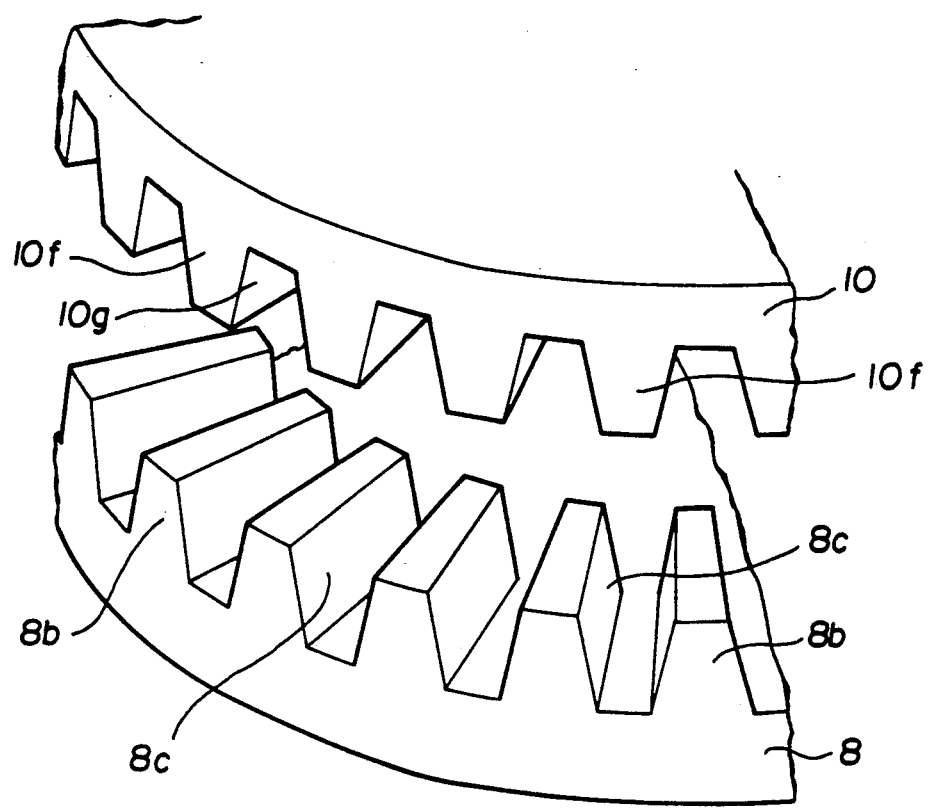
FIG. 3 is a perspective view illustrating a engaging state between the movable clutch disc and the driving side clutch disc of the actuator shown in FIG. 1.

The movable second clutch disc 10c is provided with a plurality of teeth 10f having inclined engaging flanks round the circumference on an attractive face 10e (lower face FIG. 1) thereof so as to be engaged with the teeth 8b of the first clutch disc 8 as shown in FIG. 3.

Figure 2:
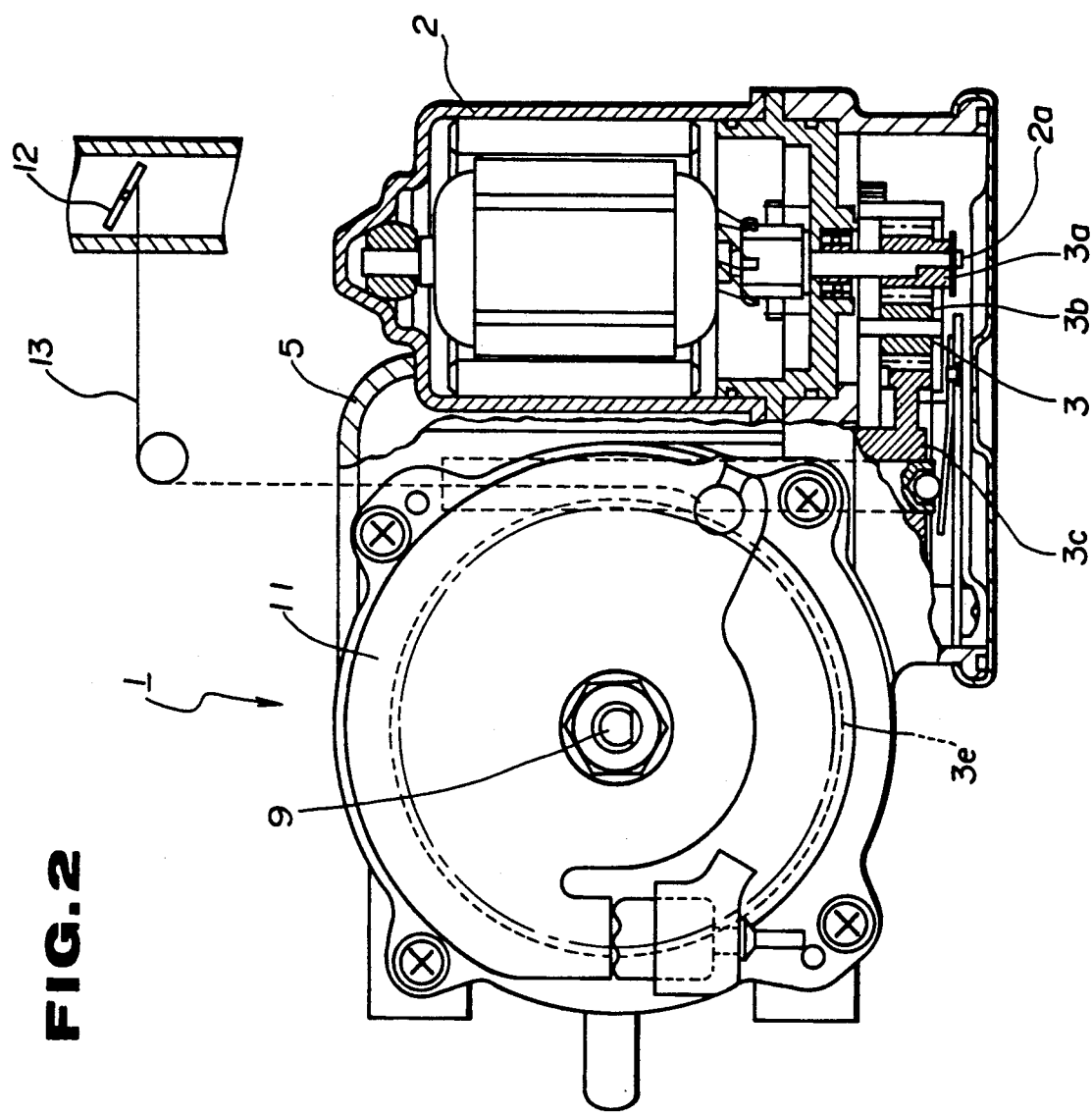
FIG. 2 is a partially horizontal sectional view illustrating the actuator shown in FIG. 1.

Additionally, the output shaft 9 is secured with an output pulley 11 on the top end thereof protruding upward from the casing 5, and the output pulley 11 is connected with a throttle 12 through a throttle wire 13 as shown in FIG. 2.

In the actuator 1 structured as described above, when the solenoid 7 is excited by supplying an electric current thereto, the movable second clutch disc 10c is attracted by the solenoid 7 against the elasticity of the flat spring 10d and the teeth 10f of the movable second clutch disc 10c are engaged with the teeth 8b of the first clutch disc 8. Whereby, torque of the motor 2 is transmitted to the output pulley 11.

Shutting off the power supply to the solenoid 7 in this state, the movable second clutch disc 10c is disengaged from the first clutch disc 8 by the elasticity of the flat spring 10d. In this manner, the actuator 1 also fulfils the function as an electromagnetic clutch.

Furthermore, in the actuator 1, the teeth 8b and 10f formed on the surfaces of the first clutch disc 8 and the movable second clutch disc 10c are provided with inclined engaging flanks 8c and 10g. Therefore, the actuator 1 is also designed so that the movable second clutch disc 10c may be disengaged from the first clutch disc 8 and 1 force larger than a predetermined value may not be output owing to slippage caused between the inclined engaging flanks 8c, 10g of the teeth 8b, 10f when the force applied on the engaging flanks 8c and 10g becomes larger than the specific value depending on inclination angle $\theta$ of the engaging flanks 8c, 10g, coefficient $\mu$ of friction between the engaging flanks 8c, 10g of the teeth 8b, 10f, attractive force F of the solenoid 7 and so on.

In this embodiment, the actuator 1 is designed as follows.

Inclination angle $\theta$ of the engaging flanks 8c, 10g: 60°
Radius r1 of the output pulley 11: 29 mm
Radius r2 of the movable second clutch disc 10c: 21.25 mm
Friction coefficient $\mu$ between the engaging flanks 8c, 10g: 0.15
Attractive force F of the solenoid 7: 8.1 kgf or 79.4N.

Figure 4:
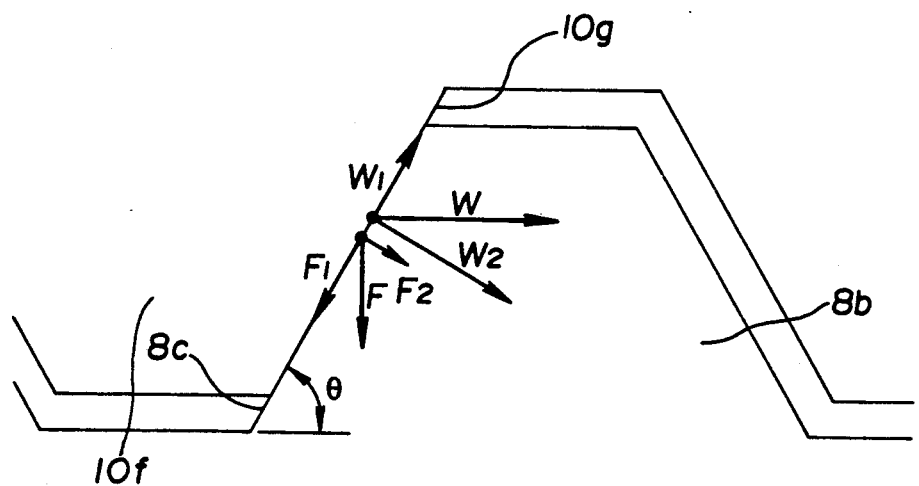
FIG. 4 is a vector diagram illustrating relationship between forces applied on flanks of teeth of both clutch discs shown in FIG. 3.

In FIG. 4, if horizontal force applied on the inclined engaging flanks 8c and 10g by the motor 2 through the reduction gears 3 is represented by W, components of the force W in the directions parallel and perpendicular to the inclined engaging flanks 8c and 10f are indicated by following W1 and W2, respectively.

$$W1 = W \cos \theta$$

$$W2 = W \sin \theta$$

Components of the attractive force F exerted on the inclined engaging flanks 8c and 10g in the directions parallel and perpendicular to the flanks 8c and 10g are indicated by following F1 and F2, respectively.

$$F1 = F \sin \theta$$

$$F2 = F \cos \theta$$

If frictional force caused between the inclined engaging flanks 8c and 10g is represented by R, the frictional force R can be described by following formula.

$$R = \mu(W2 + F2)$$

Since the movable clutch disc 10c is disengaged from the first clutch disc 8 when the force in the disengaging direction becomes larger than the frictional force R, it is possible to obtain the maximum force W by solving following equation.

$$W1 - F1 = \mu(W2 + F2)$$

$$W \cos \theta - F \sin \theta = \mu(W \sin \theta + F \cos \theta)$$

$$W = \frac{F(\mu \cos\theta + \sin\theta)}{\cos\theta - \mu \sin\theta} \quad (1)$$

On the other side, the relationship between the force W and force P applied to the throttle wire 13 is given by following formula.

$$P \cdot r1 = W \cdot r2 \quad (2)$$

Therefore, the maximum force P possible to be transmitted to the throttle wire 13 through the output pulley 11 is obtained from the formulas (1) and (2) by substituting the aforementioned numerical value as follows.

$$\begin{aligned}
P &= \frac{r2\, F\, (\mu\cos\theta + \sin\theta)}{r1\, (\cos\theta - \mu \sin\theta)} \\
&= \frac{21.25 \times 8.1 \times (0.15 \times 0.5 + 0.866)}{29 \times (0.5 - 0.15 \times 0.866)} \\
&= 15.1 \text{ (kgf or 148m)}
\end{aligned}$$

Namely, the actuator 1 is so designed as to transmit only the force not larger than 15.1 kgf to the throttle wire 13 through the output pulley 11 in this embodiment.

Explanation will be given when the actuator 1 is used for an automatic cruise control system.

When a set switch of the automatic cruise control system is changed on, a controller of the system stores a car-speed detected by a car-speed sensor as a pulse signal proportional to the actual car-speed at the time of on-operation of the set switch, and the controller calculates a set of initial parameter(s) in response to the stored car-speed and works the actuator 1 according to the calculated set initiarize.

Namely, the solenoid 7 is excited by power supply according to a command from the controller, and the movable second clutch disc 10c is attracted and moves downwardly in FIG. 1 against the elasticity of the flat spring 10d. Whereby, the teeth 10f formed on the movable second clutch disc 10c is engaged with the teeth 8b formed on the first clutch disc 8.

In this time, the motor shaft 2a of the motor 2 rotates by power supply in response to a command from the controller, the power of the motor 2 is transmitted to the first clutch disc 8 through the reduction gears 3 and rotates the first clutch disc 8 in the clockwise direction in FIG. 2. Whereby, the movable second clutch disc 10c attracted to the first clutch disc 8 is rotated together with the fixed disc 10a fixed to the output shaft 9, and the output pulley 11 secured on the top end of the output shaft 9 rotates in the clockwise direction in FIG. 2.

By the rotation of the output pulley 11 in the clockwise direction, the throttle 12 is opened appropriately and regulated so as to maintain the memorized cruising speed through the throttle wire 13.

If the automatic cruising at the memorized speed is cancelled by, for example, depressing a brake pedal in this state, the power supply to the solenoid 7 is discontinued at the same time of cutting off the power supply to the motor 2 in response to a command from the controller and the movable second clutch disc 10c is disengaged from the first clutch disc 8 by the elasticity of the flat spring 10d.

By the disengagement of the movable second clutch disc 10c from the first clutch disc 8, the output pulley 11 becomes free and the throttle 12 returns naturally to the closed position.

Additionally, if the excessive force, larger than 15.1 kgf or 148N in this embodiment, is applied on the throttle wire 13 for some reason in the excited state of the solenoid 7, it is possible to prevent the throttle 12, the throttle wire 13, the output pulley 11 and the like from the damage because the movable second clutch disc 10c is so structured as to be disengaged from the driving side clutch disc 8.

Although the explanation is merely given about the case in which the inclination angle $\theta$ of the inclined engaging flanks 8c, 10g of the teeth 8b, 10f is 60 degrees, the attractive force P of the solenoid 7 for the movable clutch disc 10c is 8.1 kgf, or 79.4N and the friction coefficient $\mu$ between the engaging flanks 8c, 10g is 0.15 in this embodiment, it is preferable respectively that the inclination angle $\theta$ is in the range of 50 to 60 degrees, the friction coefficient $\mu$ is in the range of 0.05 to 0.25 and the attractive force P of the solenoid is in the range of 2.1 to 15.5 kgf or 21-148N as the actuator for the automotive vehicles.

As described above, the actuator for automotive vehicles according to this invention comprises a motor rotatable in forward and reverse directions, a solenoid installed in a casing, a movable second clutch disc connected with an output pulley and to be attracted by excitation of the solenoid, a first clutch disc supported rotatably between the solenoid and the movable second clutch disc and rotably driven by the motor through a reduction gear, and the movable second clutch disc is disposed with a plurality of teeth having an inclined engaging flanks on an attractive face thereof, the first clutch disc is disposed with a plurality of teeth to be engagede with the plurality of teeth of the movable second clutch disc and having an inclined engaging flanks similarly to the teeth of the movable second clutch disc. Therefore, if is possible to transmit reliably the force smaller than the predetermined value through the output pulley and possible to intercept the force larger than predetermined value.

What is claimed is:

1. An actuator for controlling the position of a throttle of a vehicle engine comprising:
    a casing;
    a reversible motor having a shaft rotatable in forward and reverse directions;
    a reduction gear having at least a worm-gear rotating with the rotation of the shaft of said motor and a worm-wheel engaged with the worm-gear;
    an electro-magnetic clutch disposed in said casing having a solenoid, a first clutch disc rotatable with the worm-wheel of said reduction gear, and a second clutch disc movably disposed opposite to the first clutch disc, each of the first and second clutch discs having teeth engagable with each other, and said second clutch disc being movable toward the first clutch disc when the solenoid is excited by supplying electric current thereto;
    a fixed disc disposed opposite to the second clutch disc of said electro-magnetic clutch, and supporting the second clutch disc through a resilient member;
    an output shaft rotatably disposed in said casing and connected with said fixed disc; and
    torque transmitting means connected between said output shaft and said throttle for transmitting a torque of said output shaft to said throttle;
    wherein the teeth of the first and the second clutch discs of said electro-magnetic clutch are provided with inclined engaging flanks, having an inclination angle in a range of 50 to 60 degrees, a coefficient of friction between said inclined engaging flanks of the teeth in a range of 0.05 to 0.25, and an attractive force of the solenoid of said electro-magnetic clutch in a range of 21 to 148 Newton.

* * * * *